(12) United States Patent
Limmer et al.

(10) Patent No.: US 7,113,370 B2
(45) Date of Patent: Sep. 26, 2006

(54) SLANTED MOUNTING FOR PRELOAD FLAT SUSPENSION

(75) Inventors: Joel D. Limmer, Bloomington, MN (US); Bradley J. VerMeer, St. Paul, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 245 days.

(21) Appl. No.: 10/736,347

(22) Filed: Dec. 15, 2003

(65) Prior Publication Data

US 2005/0128645 A1   Jun. 16, 2005

(51) Int. Cl.
*G11B 21/16* (2006.01)
(52) U.S. Cl. .................................. 360/244.5
(58) Field of Classification Search ............. 360/246.2
See application file for complete search history.

(56) References Cited

U.S. PATENT DOCUMENTS

| | | | | |
|---|---|---|---|---|
| 4,605,979 A | | 8/1986 | Inoue et al. | |
| 5,367,420 A | * | 11/1994 | Yagi et al. | 360/244.5 |
| 5,561,570 A | * | 10/1996 | Gill et al. | 360/246.2 |
| 5,896,246 A | * | 4/1999 | Budde et al. | 360/244.4 |
| 5,898,540 A | * | 4/1999 | Maruyama et al. | 360/246.2 |
| 5,986,451 A | * | 11/1999 | Kagan | 324/210 |
| 6,181,521 B1 | * | 1/2001 | Yonemura et al. | 360/244.8 |
| 6,324,130 B1 | | 11/2001 | Hatam-Tabrizi et al. | |
| 6,421,207 B1 | * | 7/2002 | Sato | 360/246.4 |
| 6,574,077 B1 | | 6/2003 | Crane et al. | |
| 6,778,362 B1 | * | 8/2004 | Davis et al. | 360/244.8 |
| 2001/0048575 A1 | * | 12/2001 | Kohira et al. | 360/245.1 |
| 2004/0070882 A1 | * | 4/2004 | Wada et al. | 360/244.5 |
| 2005/0036241 A1 | * | 2/2005 | Tsuda et al. | 360/264 |

* cited by examiner

*Primary Examiner*—Allen Cao
(74) *Attorney, Agent, or Firm*—Kinney & Lange, P.A.

(57) ABSTRACT

An actuator arm of a magnetic disc drive having a mounting surface includes a mounting block having a sloped mounting surface. A base plate of a head gimble assembly is attached to the sloped mounting surface. The head gimbal assembly is unbent in its free state and is bent upon being loaded onto the disc.

13 Claims, 4 Drawing Sheets

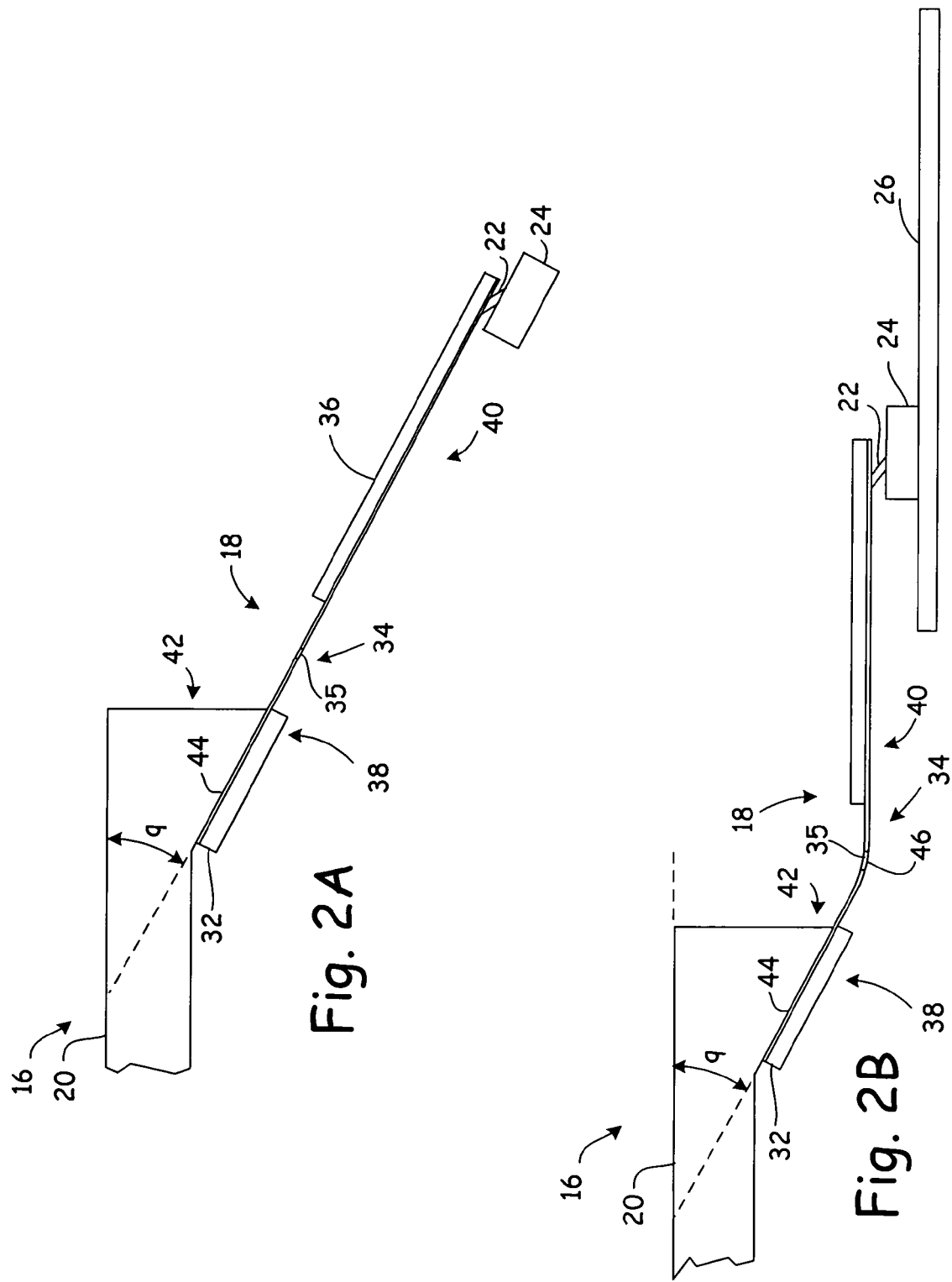

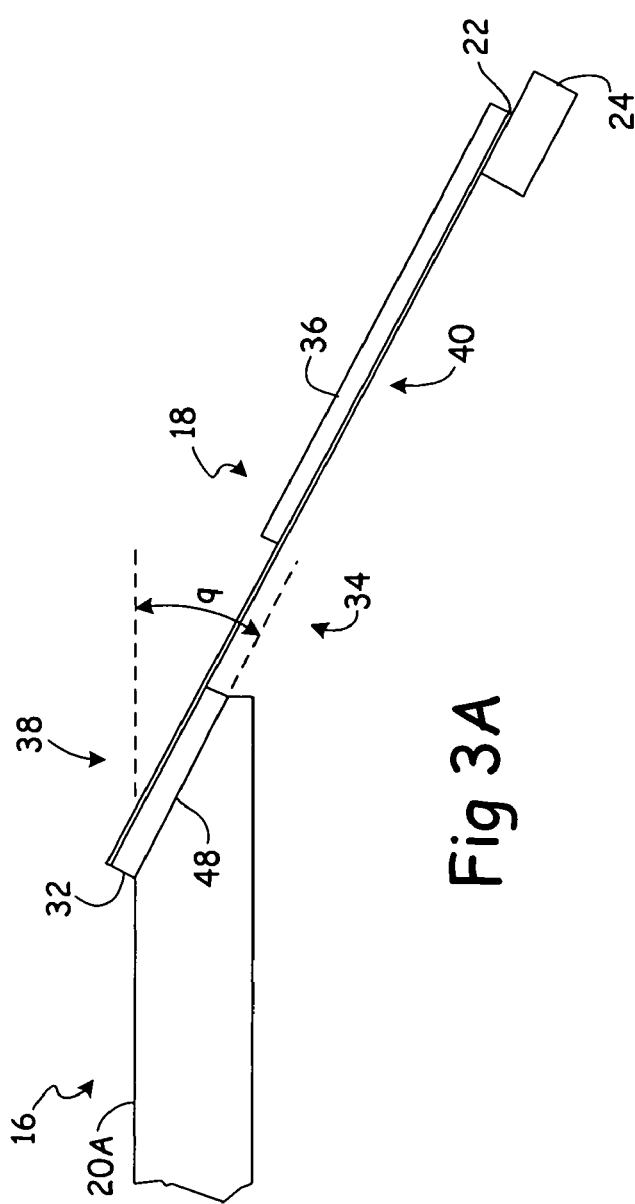
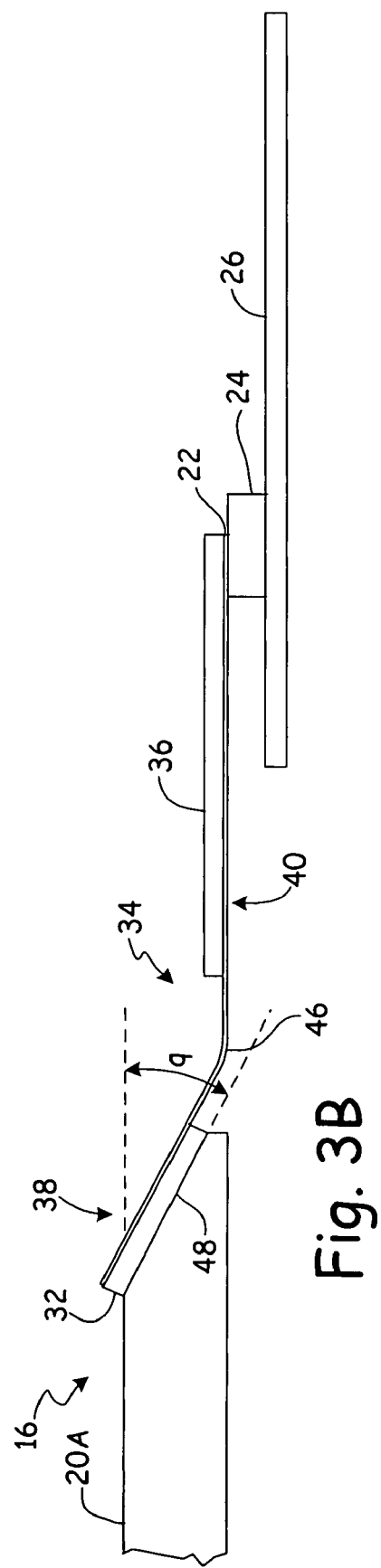
Fig 3A
Fig. 3B

US 7,113,370 B2

SLANTED MOUNTING FOR PRELOAD FLAT SUSPENSION

BACKGROUND OF THE INVENTION

The present invention relates to disc drive suspension systems and particularly to a head gimbal assembly in which the hinge region of the head gimbal assembly is unbent in its free state.

The head gimbal assembly generally includes a base plate, a hinge region, a load beam, a gimbal, a slider and a transducing head. The base plate and proximal region of the load beam are attached to a mounting block of an arm assembly.

Typically, the head gimbal assembly is pre-bent at the hinge region to place the load beam into an angled position. This is known as "forming a preload bend." Therefore, in its free state, prior to attachment to an actuation assembly, the head gimbal assembly has a convex appearance after the preload bend has been formed. This preload bend allows a specific amount of preload to be applied to the slider when the head gimbal assembly is loaded onto the media and in use. When loaded, or placed on the magnetic media, the hinge region flattens and the load beam is then relatively parallel to the magnetic media. In its loaded state, the preload, in combination with positive and negative pressures created by the slider's air bearing surface, allows the slider to fly at the proper clearance from the media.

Generally, head gimbal assemblies are shipped in the pre-bent free state where the fragile bent portion is susceptible to shipping and handling damage. This creates an increase in cost as the damaged head gimbal assemblies require retooling or scrapping.

Another problem with preloading is that the specific bend in the hinge region may not be consistently repeatable. The head gimbal assembly is very sensitive to where and how it is bent. During manufacturing special care must be utilized to ensure that the hinge region is properly bent. A change in the bend could change the force that is applied to the slider and therefore change the ability of the slider to fly over the magnetic media.

Therefore, there is a need in the art for a load beam less susceptible to damage from transportation handling, but with the ability to still provide the additional downward negative force necessary for the slider to properly fly over the media.

BRIEF SUMMARY OF THE INVENTION

The present invention includes an improved connection of an actuator arm to a head gimbal assembly that allows the head gimbal assembly to be unbent in its free state, but still able to bend and apply preload in its loaded state. The actuator arm includes an inclined mounting surface at which head gimbal assembly is attached. The attachment of the head gimbal assembly to the inclined mounting surface allows the head gimbal assembly to remain unbent in its free state and to bend in a concave manner when in its loaded state.

BRIEF DESCRIPTION OF THE DRAWINGS

FIG. 2A is a side view of one embodiment of the present invention in its free state in which the mounting block has a sloped lower portion.

FIG. 2B is a side view of the present invention as it appears when loaded onto the magnetic media.

FIG. 3A is a side view of an alternative embodiment of the present invention in its free state in which the mounting block has a sloped upper portion.

FIG. 3B is a side view of the present invention as it appears when loaded onto the magnetic media.

DETAILED DESCRIPTION

Figure 1:
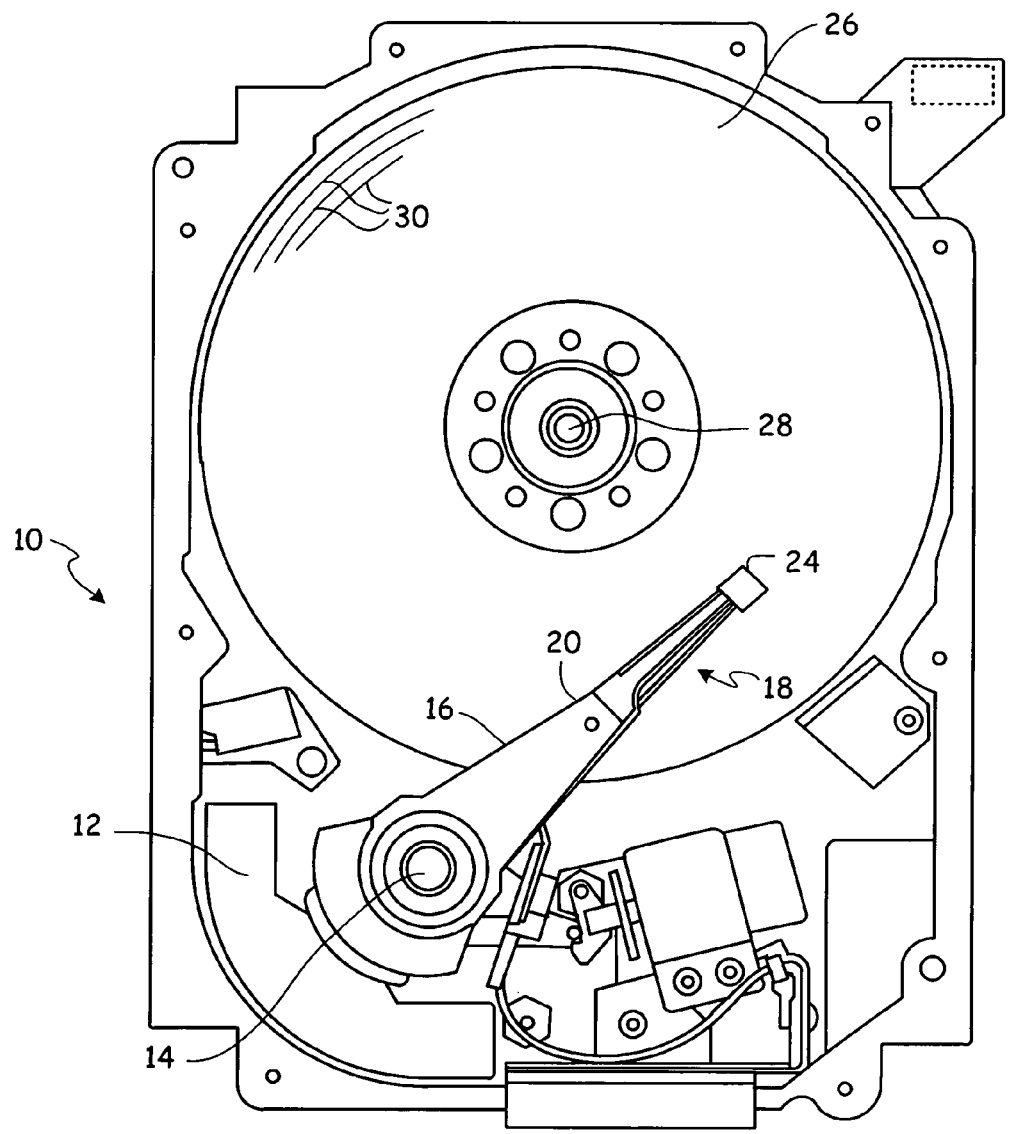
FIG. 1 is a top view of a disc drive actuation system with the actuation arm positioned over the tracks of a disc.

FIG. 1 is a top view of a disc drive actuation system 10 with the actuation arm positioned over the tracks of a disc. Actuation system 10 includes voice coil motor (VCM) 12 arranged to rotate actuator arm 16 on a spindle around axis 14. Head gimbal assembly 18 is connected to actuator arm 16 at head mounting block 20. Gimbal 22 (not shown in FIG. 1) is connected to an end of head gimbal assembly 18, and carries slider 24. Slider 24 carries a transducer head (not shown) for reading and/or writing data on disc 26, which rotates around axis 28 and includes concentric tracks 30 on which the data is written. As disc 26 rotates, windage is encountered by slider 24 to keep it aloft a small distance above the surface of disc 26. VCM 12 is selectively operated to move actuator arm 16 around axis 14, thereby moving slider 24 between tracks 30 of disc 26.

FIGS. 2A and 2B illustrate the present invention as it would appear in two separate phases, first unloaded prior to assembly to actuation system 10 and second, loaded onto a magnetic media. FIG. 2A is a side view of one embodiment of the present invention in its free state in which mounting block 20 of actuator arm 16 has a sloped portion. Actuator arm 16 includes mounting block 20 and head gimbal assembly 18. Head gimbal assembly 18 is comprised of base plate 32, hinge region 34, load beam 36, gimbal 22, slider 24 and a transducing head (not shown) carried by slider 24.

Mounting block 20 is located at the distal end of actuator arm 16. Mounting block 20 may be separate from or integral to actuator arm 16. Head gimbal assembly 18 is then located at the distal end of mounting block 20.

Head gimbal assembly 18 is divided into three regions; proximal region 38, intermediate hinge region 34 and distal region 40. Proximal region 38 is where base plate 32 and the proximal end of load beam 36 are attached to mounting block 20. Though swaging is commonly used to make the attachment between mounting block 20, base plate 32 and the proximal end of load beam 36, appropriate alternative means may also be used including, but not limited to screws, adhesives and solder. Hinge region 34, which extends from proximal region 38, is typically the region in which head gimbal assembly 18 is pre-bent. Distal region 40, which extends from hinge region 34, includes load beam 36 in which gimbal 22 is positioned at the distal end and is attached to slider 24. The distal portion of load beam 36 has a slightly different appearance than the proximal portion of load beam 36. The sides of the distal portion of load beam 36 are typically bent upwards, creating rails. This creates additional rigidity in the distal portion of load beam 36. The additional rigidity helps the distal portion of load beam 36 not to bend when actuator arm 16 is loaded while still allowing hinge region 34 to become bent. The creation of rails is one of many ways in which load beam 36 can be stiffened. Alternative methods of stiffening load beam 36 include, but are not limited to, using thin steel skins on thick core material or using alternate materials that need no stiffening features. For some applications, stiffening (with rails or otherwise) may be unnecessary.

In the present invention, mounting block 20 includes protrusion 42 which creates an angled or inclined mounting surface 44 on the bottom side of mounting block 20. Angled surface 44, with respect to the top plane of mounting block 20 is at an angle $\Theta$ greater than zero degrees, but less than ninety degrees. The amount of preload that is placed on load beam 36 can be varied based on the degree of incline of angled surface 44. Angled surface 44 is also sloped in a direction toward the surface of disc 26. Proximal region 38 of head gimbal assembly 18 is then attached to the angled surface of mounting block 20, so that head gimbal assembly 18 is also sloped in a direction toward the surface of disc 26. Hinge region 34 of head gimbal assembly 18 remains unbent in its free state.

FIG. 2B is a side view of the present invention as it appears when loaded onto the magnetic media, which in this illustration is disc 26. As shown in FIG. 2B, when head gimbal assembly 18 is loaded onto disc 26, hinge region 34 becomes bent, so that load beam 36 is relatively parallel to disc 26.

The present invention is loaded in a similar fashion as previous prior art actuator arms. Typically, actuator arms are located on both sides of a disc. The arms are positioned so that the sliders are facing toward the disc. Prior to loading, the actuator arms are kept spaced apart by a separator. Once the discs have been placed between the actuator arms, the separator is removed. This allows the slider to contact the disc and read and write data. In the prior art, as the arms came into contact with the disc, the force created from the loading process, changed the biased position of the load beam to a relatively parallel one. The same effect occurs with the present invention. The difference is in the hinged region. In the prior art, the hinged region would start with a convex bent form in an unloaded position, and become relatively parallel to the disc in a loaded position. In the present invention, the hinge region is not bent in an unloaded position and become bent, or bowed so that it is concave in a loaded position. In both scenarios, the process of loading creates a force which changes the form of the hinge region.

In one embodiment, bend 46 in hinge region 34 is facilitated by a decrease in the amount of material used in the bent area. Therefore, portions of hinge region 34 surrounding bend 46 are thicker than the actual bent area itself. This helps hinge region 34 to consistently bend into the proper position when loaded on disc 26. In another embodiment, a small notch 35 is made on hinge region 34 to ensure that hinge region 34 can be consistently bent into the proper position when loaded on disc 26.

FIGS. 3A and 3B illustrate an alternative embodiment of the present invention as it would appear in two separate phases, first unloaded prior to assembly to actuation system 10 and second, loaded onto a magnetic media. FIG. 3A is a side view of an alternative embodiment of the present invention in its free state in which mounting block 20A has a sloped upper portion. In this embodiment, the distal end of mounting block 20A has a beveled surface 48 on the top side. Beveled surface 48 of mounting block 20A is sloped in the direction of the disc surface of disc 26. Head gimbal assembly 18 is attached to beveled surface 48 of mounting block 20A in the same manner as discussed in FIG. 1. This embodiment allows hinge region 34 to remain unbent in its free state and to bend once actuator arm 16 is loaded onto disc 26. As shown, FIG. 3B is a side view of the present invention as it appears when loaded onto disc 26.

Figure 4A:
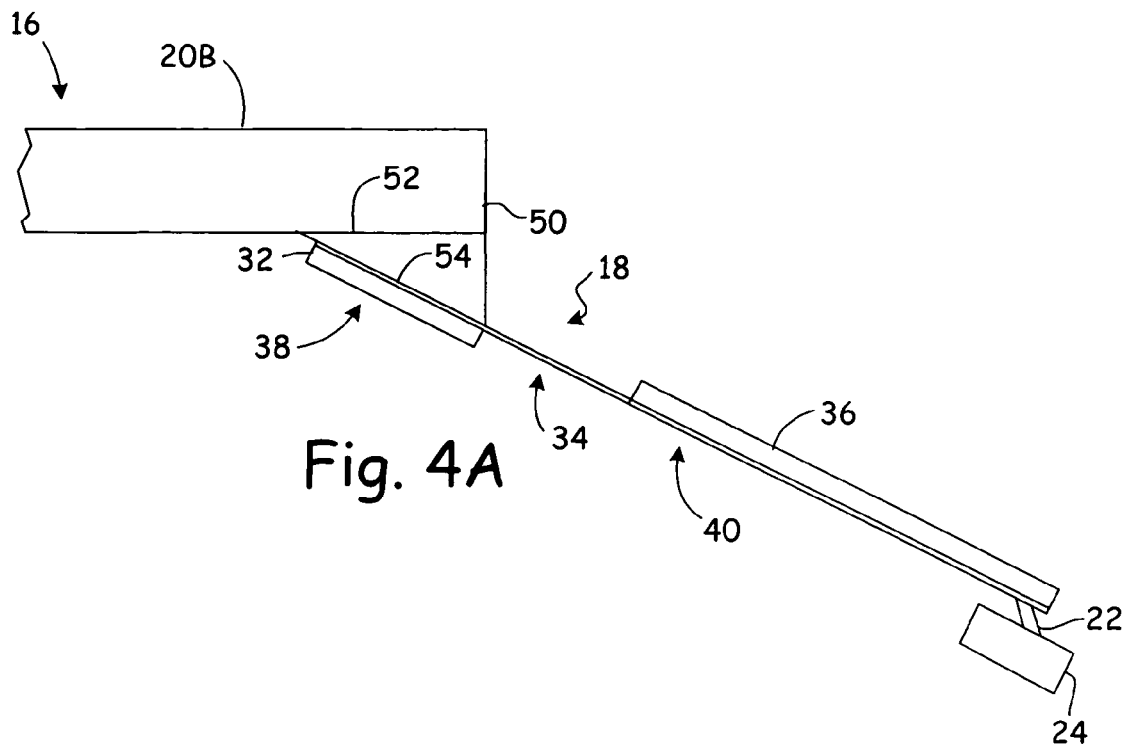
FIG. 4A is a side view of another alternative embodiment of the present invention in its free state in which the mounting block has a sloped portion.
Figure 4B:
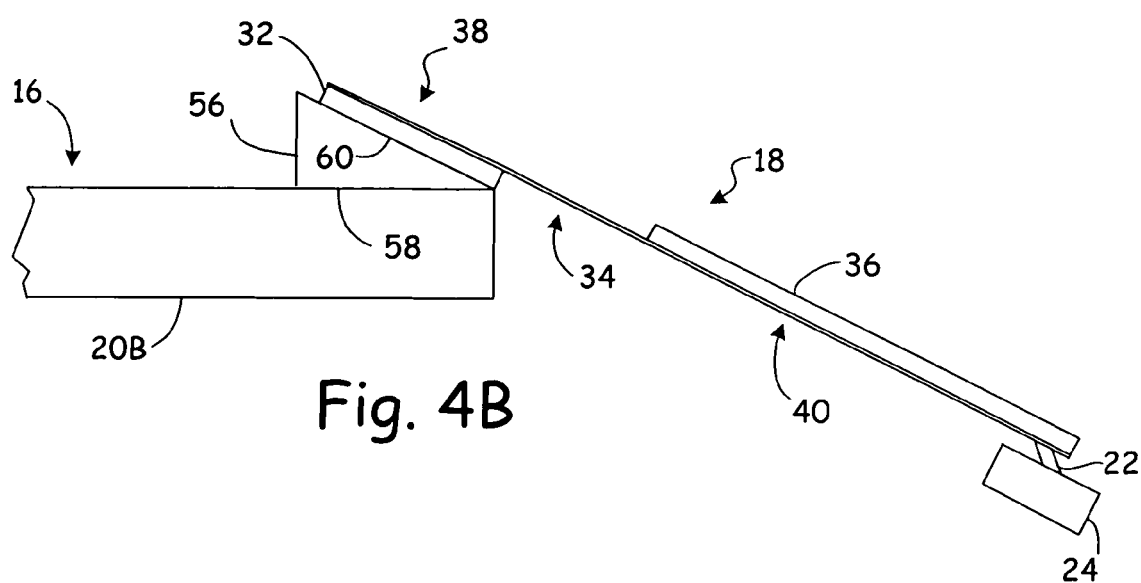
FIG. 4B is a side view of an alternative embodiment of the present invention in its free state in which the mounting block has a sloped portion.

FIGS. 4A and 4B illustrate another alternative embodiment of the present invention as it would appear in two separate phases, first unloaded prior to assembly to actuation system 10 and second, loaded onto a magnetic media. FIG. 4A is a side view of another alternative embodiment of the present invention in its free state in which mounting block 20B has been modified to have a sloped portion. In this embodiment, wedge 50 has been added to the lower surface of mounting block 20B. Wedge 50 has a flat surface 52 which is attached to the surface of mounting block 20B. Wedge 50 can be attached to mounting block 20 by any suitable means including, but not limited to solder, swage, bolts and screws. Wedge 50 also has a sloped surface 54. Base plate 32 of head gimbal assembly 18 is attached to sloped surface 54 in the same manner as described in FIG. 1. The addition of wedge 50 allows for hinge region 34 to remain unbent in its free state and to bend with it is loaded onto a magnetic media without having to retool a regular mounting block.

FIG. 4B is a side view of an alternative embodiment to the embodiment described in FIG. 4A. In this embodiment, wedge 56 is attached to the top side of mounting block 20B rather than the bottom side of mounting block 20B. Wedge 56 has a flat surface 58 which is attached to the surface of mounting block 20B by any suitable means including, but not limited to solder, swage, bolts and screws. Wedge 56 also has a sloped surface 60 which base plate 32 of head gimbal assembly 18 can be attached to via methods described in FIG. 1. The attachment of wedge 56 on the top side of mounting block 20B does not effect the function of the invention. The addition of wedge 56 still allows for hinge region 34 to remain unbent in its free state and to bend with it is loaded onto a magnetic media without having to retool a regular mounting block.

The addition of a sloped surface on mounting block 20B allows for head gimbal assembly 18 to be unbent in its free state and still have the ability to bend in hinge region 34 when loaded. Due to the fragile nature of the bend in hinge region 34 it is more susceptible to damage from shipping and handling. This invention allows for a reduction in costs because of a reduction in damage which would require retooling or scrapping.

Although the present invention has been described with reference to preferred embodiments, workers skilled in the art will recognize that changes may be made in form and detail without departing from the spirit and scope of the invention.

The invention claimed is:

1. An actuator for data storage devices, the actuator comprising:

an actuator arm having a proximal end and a distal end, the actuator arm being rotatable in a rotational plane for supporting a transducer with respect to a data storage medium; and a head gimbal assembly connected to the distal end of the actuator arm at an inclined angle with respect to the rotational plane of the actuator arm, wherein the head gimbal assembly comprises:

a load beam having a proximal region, a distal region, and a bendable hinge region between the proximal region and the distal region;

a slider for carrying the transducer, wherein the slider includes an air-bearing surface; and a gimbal connecting the slider to the distal region of the load beam.

2. The actuator of claim 1 wherein the head gimbal assembly comprises a base plate at the proximal region of the load beam.

3. The actuator of claim 1 wherein the bendable hinge region includes a notch across the load beam.

4. The actuator of claim 1 wherein the actuator arm includes a mounting block having an angled surface.

5. The actuator of claim 4 wherein the mounting block is positioned on a side of the actuator arm that is facing the data storage medium.

6. The actuator of claim 1 and further comprising:
a wedge with a planar surface and an angled surface, wherein the actuator arm is attached to the planar surface of the wedge and the head gimbal assembly is attached to the angled surface of the wedge.

7. A data storage device, the storage device comprising:
a data storage disc;
a rotatable arm with a distal end and a proximal end; and
a head gimbal assembly attached to the distal end at an angle so that when loaded against the disc, the head gimbal assembly is concave in a direction facing away from the disc, wherein the head gimbal assembly comprises:
a load beam having a proximal region, a distal region, and a flexible hinge region between the proximal region and the distal region;
a slider for carrying a transducer; and
a gimbal connecting the slider to the distal region of the load beam.

8. The data storage device of claim 7 wherein the head gimbal assembly further comprises a base plate at the proximal region of the load beam.

9. The data storage device of claim 7 wherein the flexible hinge region includes a notch across the load beam.

10. An actuator for positioning a transducer with respect to a storage medium in a storage device, the actuator comprising:
a mounting block with a sloped mounting surface wherein the sloped mounting surface is greater than zero degrees, but less than ninety degrees with respect to a top plane of the mounting block so that the sloped mounting surface creates a downward plane; and
a head gimbal assembly attached to the sloped mounting surface of the mounting block, wherein the head gimbal assembly comprises:
a load beam having a proximal region, a distal region, and a bendable hinge region between the proximal region and the distal region;
a slider for carrying a transducer; and
a gimbal connecting the slider to the distal region of the load beam.

11. The actuator of claim 10 wherein the head gimbal assembly further comprises a base plate at the proximal end of the load beam.

12. The actuator of claim 10 wherein the bendable hinge region includes a notch across the load beam.

13. A method of assembling an actuator, the method comprising:
attaching an unbent head gimbal assembly to a mounting block with a sloped surface, the head gimbal assembly having a bendable hinge region; and
loading the head gimbal assembly onto a data storage medium to create a bend in the hinge region so that a portion of the head gimbal assembly assumes a oncave shape facing away from the data storage medium.

* * * * *